United States Patent
Li et al.

(10) Patent No.: US 9,034,956 B2
(45) Date of Patent: May 19, 2015

(54) STABILIZER COMPOSITION FOR POLYMERS

(75) Inventors: Shuang di Shandy Li, Shanghai (CN); Alex Wegmann, Allschwil (CH)

(73) Assignee: BASF SE, Ludwigshafen (DE)

( * ) Notice: Subject to any disclaimer, the term of this patent is extended or adjusted under 35 U.S.C. 154(b) by 2 days.

(21) Appl. No.: 13/883,887

(22) PCT Filed: Nov. 11, 2011

(86) PCT No.: PCT/EP2011/069950
§ 371 (c)(1),
(2), (4) Date: May 7, 2013

(87) PCT Pub. No.: WO2012/065919
PCT Pub. Date: May 24, 2012

(65) Prior Publication Data
US 2013/0225734 A1  Aug. 29, 2013

(30) Foreign Application Priority Data
Nov. 16, 2010  (WO) ................ PCT/CN2010/078795

(51) Int. Cl.
*C08K 5/00* (2006.01)
*C08K 5/3432* (2006.01)
(Continued)

(52) U.S. Cl.
CPC ............... *C08K 5/005* (2013.01); *C08K 5/1345* (2013.01); *C08K 5/375* (2013.01); *C08K 5/378* (2013.01)

(58) Field of Classification Search
CPC .......... C08K 5/00; C08K 5/3432; C08K 5/45; C08K 5/46
USPC .......................................... 524/100; 252/402
See application file for complete search history.

(56) References Cited

U.S. PATENT DOCUMENTS

| 3,940,325 A | 2/1976 | Hirao |
| 4,792,584 A | 12/1988 | Shiraki et al. |

(Continued)

FOREIGN PATENT DOCUMENTS

| CN | 101565513 | 8/2009 |
| EP | 0238140 A2 | 9/1987 |

(Continued)

OTHER PUBLICATIONS

English language abstract of KR 2008 0048832 Jun. 3, 2008.

(Continued)

*Primary Examiner* — James J Seidleck
*Assistant Examiner* — Deve E Valdez
(74) *Attorney, Agent, or Firm* — Oblon, McClelland, Maier & Neustadt, L.L.P.

(57) ABSTRACT

The present invention relates to a composition, which comprises (a) a compound of formula (A-1) (b) a compound of formulae (B-1), (B-11), (B-111) or (B-IV) wherein $Z_1$ is linear $C_{12}$-alkyl or linear $C_{18}$-alkyl, and (c) a compound, which is a further sterically hindered phenolic antioxidant. The composition is used for stabilization of an organic polymer against degradation by heat, light and/or oxidation. The organic polymer is for example a styrene-butadiene copolymer, a styrene-isoprene copolymers or polybutadiene.

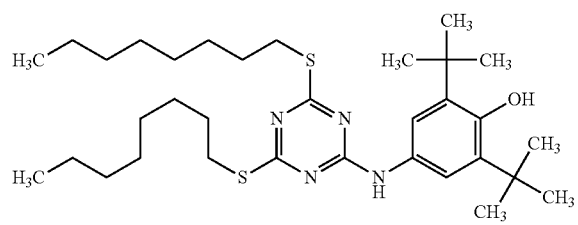

(A-I)

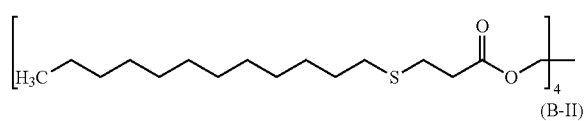

(B-I)

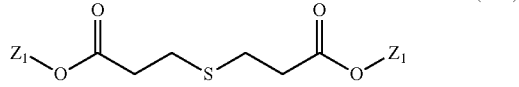

(B-II)

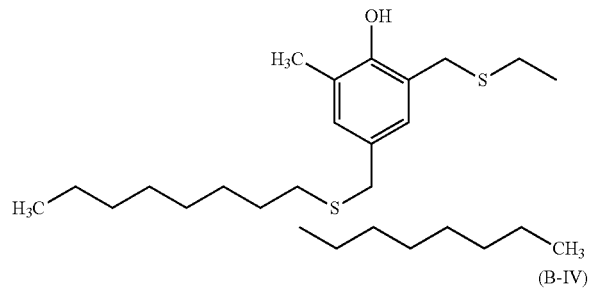

(B-III)

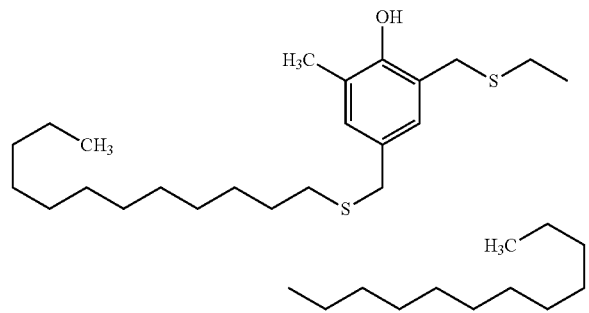

(B-IV)

10 Claims, No Drawings

(51) Int. Cl.
*C08K 5/45* (2006.01)
*C08K 5/46* (2006.01)
*C08K 5/134* (2006.01)
*C08K 5/375* (2006.01)
*C08K 5/378* (2006.01)

(56) References Cited

U.S. PATENT DOCUMENTS

| | | | |
|---|---|---|---|
| 5,116,894 | A | 5/1992 | Knobloch |
| 5,164,434 | A | 11/1992 | Liwak et al. |
| 6,214,909 | B1 | 4/2001 | Masuyama |
| 6,284,374 | B1 | 9/2001 | Yamazaki et al. |
| 2006/0183829 | A1 | 8/2006 | Fujimoto et al. |
| 2010/0056675 | A1* | 3/2010 | Kiura et al. ............ 524/99 |
| 2010/0204397 | A1 | 8/2010 | Kobayashi et al. |
| 2011/0046278 | A1 | 2/2011 | Wegmann et al. |

FOREIGN PATENT DOCUMENTS

| | | |
|---|---|---|
| EP | 0243956 A2 | 11/1987 |
| GB | 1422454 A | 1/1976 |
| JP | 07-196868 | 8/1995 |
| JP | 2002241574 A | 8/2002 |
| JP | 2010077382 | 4/2010 |
| KR | 2008 0048832 A | 6/2008 |
| WO | 03057772 A2 | 7/2003 |
| WO | 2004/106311 | 12/2004 |
| WO | WO2008/062860 * | 5/2008 |
| WO | 2009080554 A1 | 7/2009 |
| WO | 2010/000638 | 1/2010 |

OTHER PUBLICATIONS

English language abstract of JP 07-196868 Aug. 1, 1995.
English language abstract of JP2002241574 Aug. 28, 2002.
English language abstract of JP 2010-077382 Apr. 8, 2010.
English language abstract of CN10156513 Oct. 28, 2009.

* cited by examiner

STABILIZER COMPOSITION FOR POLYMERS

Polymers are susceptible to degradation, which can be induced for example by heat, light and/or oxidation.

For reducing of said degradation, numerous solutions in regard to an addition of a stabilizer or stabilizer combinations are proposed.

EP-A-0238140 discloses inter alia a composition comprising a phenolic antioxidant and a thioether for stabilization of polymers.

EP-A-0243956 discloses inter alia a composition comprising a phenolic antioxidant and a thioether for stabilization of polymers.

JP-A-07196868 discloses inter alia a composition comprising a phenolic antioxidant and a thioether for stabilization of polymers.

U.S. Pat. No. 6,284,374 discloses inter alia a composition comprising a phenolic antioxidant and a thioether for stabilization of polymers.

JP-A-2002/241574 discloses inter alia a composition comprising a phenolic antioxidant and a thioether for stabilization of polymers.

US-A-2006/0183829 discloses inter alia a composition comprising a phenolic antioxidant and a thioether for stabilization of polymers.

JP-A-2010/077382 discloses inter alia a composition comprising a phenolic antioxidant and a thioether for stabilization of polymers.

There is still a need for further technical solutions towards polymer stabilisation in regard to heat stability, light stability and/or oxidation stability.

It has now been found that certain specific combinations of stabilizers according to the invention meet the above-mentioned heat, light and/or oxidation stability criteria to a larger extent.

The present invention relates to a composition, which comprises (a) a compound of formula (A-I)

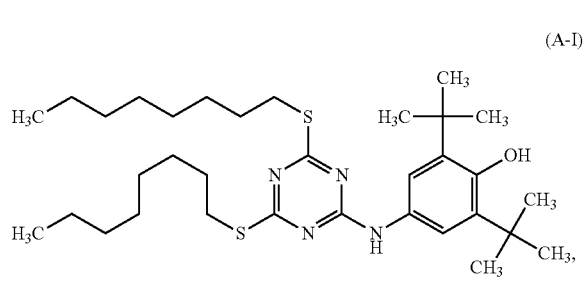 [SMILES: CCCCCCCCSc1nc(Nc2cc(C(C)(C)C)c(O)c(C(C)(C)C)c2)nc(SCCCCCCCC)n1]

(b) a compound of formulae (B-I), (B-II), (B-III) or (B-IV)

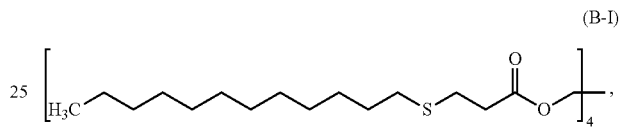

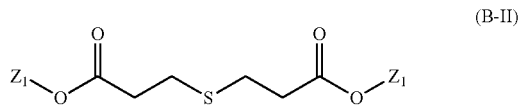

wherein $Z_1$ is linear $C_{12}$-alkyl or linear $C_{18}$-alkyl,

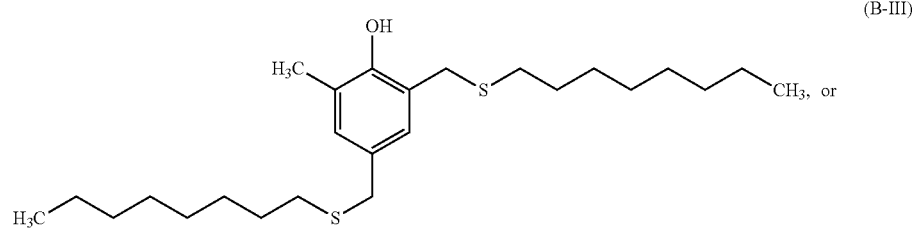

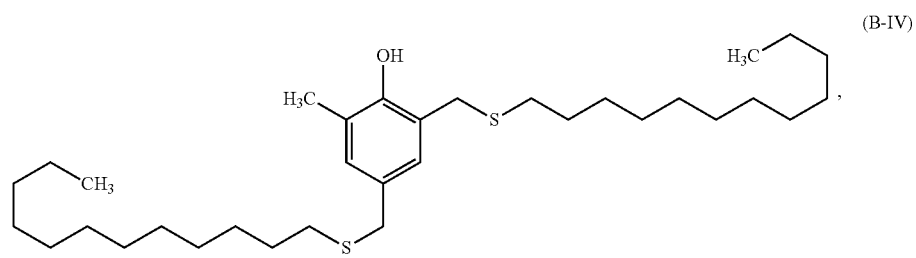

and
(c) a compound of formulae (C-I), (C-II) or (C-III)

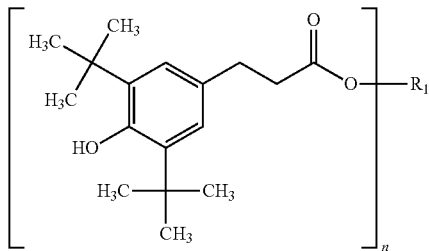

wherein
n=1 or 4,
when n=1, $R_1$ is $C_1$-$C_{18}$ alkyl,
when n=4, $R_1$ is 2,2-dimethylprop-1,3,1',1"-tetrayl,

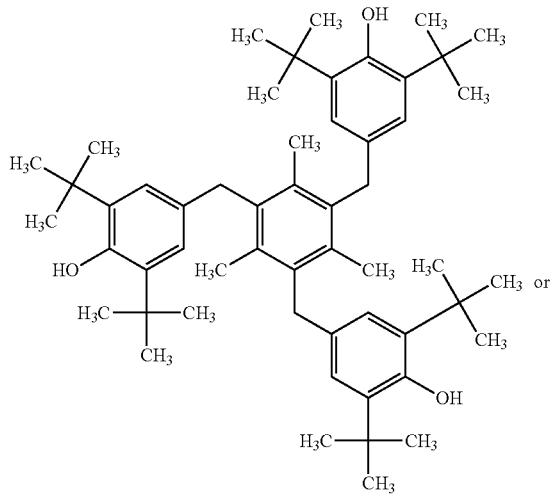

$C_1$-$C_{18}$ alkyl is for example methyl, ethyl, propyl, butyl, pentyl, hexyl, heptyl, octyl, isooctyl, 2-ethylhexyl, nonyl, iso-nonyl, decyl, undecyl, dodecyl, tridecyl, branched tridecyl, tetradecyl, pentadecyl, branched pentadecyl, hexadecyl and octadecyl[=stearyl].

Preferred is methyl, $C_7$-$C_9$-alkyl, $C_{13-15}$-alkyl and octadecyl. Especially preferred is octadecyl, in particular linear octadecyl.

The compound of formula (B-III) is 2,4-di(octylthiomethyl)-6-methylphenol and is contained in commercial Irganox 1520 (® BASF).

The compound of formula (B-IV) is 2,4-di(dodecylthiomethyl)-6-methylphenol and is contained in commercial Irganox 1726 (® BASF).

The compound of formula (C-I), wherein when n=4, $R_1$ is 2,2-dimethylprop-1,3,1',1"-tetrayl, is tetrakis-[3-(3,5-di-tert-butyl-4-hydroxyphenyl)propionyloxymethyl]-methane, which is contained in commercial Irganox 1010 (® BASF) and depicted below:

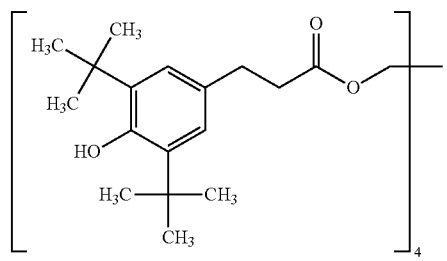

Preferred is a composition, which comprises
(a) a compound of formula (A-I),
(b) a compound of formula (B-I), and
(c) a compound of formulae (C-I), (C-II) or (C-III).
Preferred is a composition, which comprises
(a) a compound of formula (A-I),
(b) a compound of formula (B-I), and
(c) a compound of formula (C-I).
Preferred is a composition, which comprises
(a) a compound of formula (A-I),
(b) a compound of formula (B-I), and
(c) a compound of formula (C-I),
wherein n=1 and $R_1$ is $C_1$-$C_{18}$ alkyl.
Preferred is a composition, which comprises
(a) a compound of formula (A-I),
(b) a compound of formula (B-I), and
(c) a compound of formula (C-I),
wherein n=1 and $R_1$ is linear octadecyl.
Preferred is a composition, which comprises
(a) a compound of formula (A-I),
(b) a compound of formula (B-II), and
(c) a compound of formulae (C-I), (C-II) or (C-III).
Preferred is a composition, which comprises
(a) a compound of formula (A-I),
(b) a compound of formulae (B-III) or (B-IV), and
(c) a compound of formulae (C-I), (C-II) or (C-III).

The additive compositions are useful for the stabilisation of an organic polymer against the degradation by heat, light and/or oxidation.

Heat stability is relevant for example during the high temperatures at the processing of an organic polymer. Heat stability is also important in regard to long-term thermal stability of the organic polymer.

Preferred is a stabilization, which provides a balance between stability of the polymer during short-term processing with its high temperatures and stability of the polymer during long-term storage.

Suitable tests for determination of the aforementioned balance are the Brabender induction time test procedure and oven ageing. The Brabender induction time test procedure with a temperature for example of 160° C. simulates short-term processing at high temperatures, shear and low oxygen content, while oven aging at an elevated temperature—like 70° C. or 80° C.—simulates long-term storage of the polymer. The stability of the polymer against degradation during oven aging can be determined by measurement of the yellowness index, i.e. little yellowing is desired, and measurement of the gel content, i.e. little gel content is desired.

Light stability is relevant especially during the long-term use of the organic polymer.

Oxidation can occur concomitantly and often aggravates the detrimental effects of light and/or heat.

The present additive compositions provide also a combination of heat and light stability, e.g. heat stability during the high temperature of processing in combination with long-term light stability or long-term heat stability in combination with long-term light stability.

A further technical advantage is that the additive composition itself has got a low emission potential and accordingly, also an organic polymer containing the additive composition possesses a lower emission potential.

An organic polymer as defined herein can be a natural, a semi-natural or a synthetic polymer.

Examples for organic polymers are:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1., for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1. above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.-4. may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; random compolymers of styrene such as styrene-butadiene-styrene random copolymer (=S-SBR) and block copolymers of styrene such as styrene-butadiene-styrene block copolymer (=SBS), styrene-isoprene-styrene block copolymer (=SIS), styrene-ethylene-butadiene-styrene block copolymer (=SEBS), styrene-ethylene-butylene-styrene block copolymer or styrene-ethylene-propylene-styrene block copolymer.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9. with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1. above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimides, polyesterimides, polyhydantoins and polybenzimidazoles.

18. Polyesters derived from dicarboxylic acids and diols and/or from hydroxycarboxylic acids or the corresponding lactones or lactides, for example polyethylene terephthalate, polybutylene terephthalate, poly-1,4-dimethylolcyclohexane terephthalate, polyalkylene naphthalate and polyhydroxybenzoates as well as copolyether esters derived from hydroxyl-terminated polyethers, and also polyesters modified with polycarbonates or MBS. Copolyesters may comprise, for example—but are not limited to—polybutylenesuccinate/terephtalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer. Furthermore, aliphatic polyesters may comprise, for example—but are not limited to—the class of poly(hydroxyalkanoates), in particular, poly(propiolactone), poly(butyrolactone), poly(pivalolactone), poly(valerolactone) and poly(caprolactone), polyethylenesuccinate, polypropylenesuccinate, polybutylenesuccinate, polyhexamethylenesuccinate, polyethyleneadipate, polypropyleneadipate, polybutyleneadipate, polyhexamethyleneadipate, polyethyleneoxalate, polypropyleneoxalate, polybutylene oxalate, polyhexamethyleneoxalate, polyethylenesebacate, polypropylenesebacate, polybutylenesebacate and polylactic acid (PLA) as well as corresponding polyesters modified with polycarbonates or MBS. The term 'polylactic acid (PLA)' designates a homopolymer of preferably poly-L-lactide and any of its blends or alloys with other polymers; a co-polymer of lactic acid or lactide with other monomers, such as hydroxy-carboxylic acids, like for example glycolic acid, 3-hydroxy-butyric acid, 4-hydroxy-butyric acid, 4-hydroxy-valeric acid, 5-hydroxy-valeric acid, 6-hydroxy-caproic acid and cyclic forms thereof; the terms 'lactic acid' or 'lactide' include L-lactic acid, D-lactic acid, mixtures and dimers thereof, i.e. L-lactide, D-lactide, meso-lactide and any mixtures thereof.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Preferred is a composition, which comprises
(a) a compound of formula (A-I),
(b) a compound of formulae (B-I), (B-II), (B-III) or (B-IV),
(c) a compound of formulae (C-I), (C-II) or (C-III), and
(d) an organic polymer.

Preferred is a composition, which comprises
(a) a compound of formula (A-I),
(b) a compound of formulae (B-I), (B-II), (B-III) or (B-IV),
(c) a compound of formulae (C-I), (C-II) or (C-III), and
(d) an organic polymer, which is selected from the group consisting of copolymers as described at item 6a. and polybutadiene.

Preferred is a composition, wherein the organic polymer (d) is selected from the group consisting of styrene copolymers and polybutadiene.

Preferred is a composition, wherein the organic polymer (d) is selected from the group consisting of butadiene-styrene copolymers, isoprene-styrene copolymers and polybutadiene.

Preferred is a composition, wherein the organic polymer (d) is selected from the group consisting of butadiene-styrene copolymers and isoprene-styrene copolymers.

Preferred is a composition, wherein the organic polymer (d) is selected from the group consisting of styrene-butadiene-styrene block copolymer, styrene-isoprene-styrene block copolymer, styrene-ethylene-butadiene-styrene copolymer, styrene-butadiene-styrene random copolymer and polybutadiene.

Preferred is a composition, wherein the organic polymer (d) is selected from the group consisting of styrene-butadiene-styrene block copolymer, styrene-isoprene-styrene block copolymer, styrene-ethylene-butadiene-styrene copolymer and styrene-butadiene-styrene random copolymer.

There are different types of polymerisation processes known for monomers, for example solution polymerisation, wherein the monomers are dissolved in an organic solvent like cyclohexane, and emulsion polymerisation, in particular aqueous emulsion polymerisation, wherein typically water-insoluble monomers are emulsified in water.

Preferred is a composition, wherein the organic polymer (d) originates from a solution polymerisation process or an aqueous emulsion polymerisation process.

Preferred is a composition, wherein the organic polymer (d) originates from a solution polymerisation process.

Preferred is a composition, wherein the organic polymer (d) originates form a solution polymerisation and wherein the organic polymer (d) is selected from the group consisting of styrene-butadiene-styrene block copolymer, styrene-isoprene-styrene block copolymer and styrene-ethylene-butadiene block copolymer.

Preferred is a composition, wherein the organic polymer (d) is a styrene-butadiene-styrene block copolymer and originates from a solution polymerisation process, wherein the weight ratio of the reacted monomers styrene to butadiene is from 1 to 4 until 4 to 1, i.e. from 1 part styrene to 4 parts butadiene until 4 parts styrene to 1 part butadiene.

Preferred is a composition, wherein the composition comprising component (a), component (b) and component (c) is soluble in cyclohexane at room temperature of 20° C.

The weight ratio of a component (a), which is a compound of formula (A-I), to a component (b), which is a compound of formulae (B-I), (B-II), (B-III) or (B-IV), can be from 2 to 1 until 1 to 20, in particular from 1 to 3 until 1 to 20, especially from 1 to 4 until 1 to 10 and very especially from 1 to 4 until 1 to 8.

Preferred is a composition, wherein the weight ratio of a component (a) to component (b) is from 2 to 1 until 1 to 20.

The weight ratio of a component (a), which is a compound of formula (A-I), to a component (c), which is a compound of formulae (C-I), (C-II) or (C-III), can be from 1 to 1 until 1 to 60, in particular from 1 to 3 until 1 to 25, especially from 1 to 5 until 1 to 25 and very especially from 1 to 5 until 1 to 15.

Preferred is a composition, wherein the weight ratio of a component (a) to component (c) is from 1 to 1 until 1 to 60.

Preferred is a composition, wherein the weight ratio of component (a) to component (b) is from 2 to 1 until 1 to 20 and the weight ratio of component (a) to component (c) is from 1 to 1 until 1 to 60.

Preferred is a composition, wherein the weight ratio of component (a) to component (b) is from 1 to 3 until 1 to 20 and the weight ratio of component (a) to component (c) is from 1 to 5 until 1 to 60.

Preferred is a composition, wherein the weight ratio of component (a) to component (b) is from 1 to 4 until 1 to 10 and the weight ratio of component (a) to component (c) is from 1 to 5 until 1 to 25.

Preferred is a composition, wherein the weight ratio of component (a) to component (b) is from 1 to 4 until 1 to 6 and the weight ratio of component (a) to component (c) is from 1 to 5 until 1 to 8.

Stabilizers are typically employed in a small amount in relation to the material to be stabilized. In a composition comprising component (a), component (b), component (c) and component (d), the combined weight of component (a), component (b) and component (c) is from 0.01% to 20% of the weight of component (d), in particular from 0.02% to 10%, especially from 0.1% to 1.3% and very especially from 0.3% to 0.8%.

Preferred is a composition, wherein the combined weight of component (a), component (b) and component (c) is from 0.02% to 10% of the weight of component (d).

Preferred is a composition, wherein
the weight of component (a) is from 0.015% to 0.1% of the weight of component (d),
the weight of component (b) is from 0.045% to 0.3% of the weight of component (d), and
the weight of component (c) is from 0.1% to 0.8% of the weight of component (d).

Preferred is a composition, wherein
the weight of component (a) is from 0.02% to 0.04% of the weight of component (d),
the weight of component (b) is from 0.1% to 0.2% of the weight of component (d), and
the weight of component (c) is from 0.2% to 0.5% of the weight of component (d).

Preferred is a composition, which comprises
(a) a compound of formula (A-I),
(b) a compound of formula (B-I), (B-II), (B-III) or (B-IV),
(c) a compound of formulae (C-I), (C-II) or (C-III), and
(d) an organic polymer which is selected from the group of styrene-butadiene-styrene block copolymer, styrene-isoprene-styrene block copolymer, styrene-ethylene-butadiene-styrene copolymer, styrene-butadiene-styrene random copolymer and polybutadiene,
wherein
the weight of component (a) is from 0.015% to 0.1% of the weight of component (d),
the weight of component (b) is from 0.045% to 0.3% of the weight of component (d), and
the weight of component (c) is from 0.1% to 0.8% of the weight of component (d).

The composition comprising a component (a), component (b) and component (c) can contain a further additive.

Examples of further additives are:

1. Antioxidants 1.1. Alkylated Monophenols, selected from a group consisting of 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol and 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-ethylphenol, 2,6-di-dodecylthiomethyl-4-nonylphenol.

1.3. Hydroquinones and Alkylated Hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated Thiodiphenyl Ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonyl phenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]-terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-Benzyl Compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated Malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic Hydroxybenzyl Compounds, selected from the group consisting of 1,4-bis(3,5-di-tert-butyl-4-hydroxybenzyl)-2,3,5,6-tetramethylbenzene and 2,4,6-tris(3,5-di-tert-butyl-4-hydroxybenzyl)phenol.

1.10. Triazine Compounds, selected from the group consisting of 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine and 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl 3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, which are selected from the group consisting of 1,6-hexanediol, 1,9-nonanediol, ethylene glycol, 1,2-propanediol, neopentyl glycol, thiodiethylene glycol, diethylene glycol, triethylene glycol, tris(hydroxyethyl)isocyanurate, N,N-bis(hydroxylethyl)oxamide, 3-thiaundecanol, 3-thiapentadecanol, trimethylhexanediol, trimethylolpropane and 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, for example with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl)propionic acid with mono- or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]-octane.

1.17. Amides of β-(3,5-di-tert-butyl-4-hydroxyphenyl)propionic acid, for example N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]-propionyloxy)ethyl]oxamide (Naugard XL-1), (®, supplied by Uniroyal).

1.18. Ascorbic Acid (Vitamin C)

1.19. Aminic Antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1,3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-g-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-g-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)-phenyl)-5-chloro-benzotriazole, 2-(3'-tert-butyl-2'-hydroxy-5'-(2-methoxycarbonylethyl)-phenyl)benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

$$[R-CH_2CH_2-COO-CH_2CH_2\hspace{-2pt}]_{\overline{2}}\,,$$

where R=3'-tert-butyl-4'-hydroxy-5'-2H-benzotriazol-2-ylphenyl, 2-[2'-hydroxy-3'-(α,α-dimethyl benzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of Substituted and Unsubstituted Benzoic Acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate).

2.5. Nickel Compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically Hindered Amines, for example bis-[2,2,6,6-tetramethyl-1-(undecyloxy)-piperidine-4-yl]carbonate, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)-hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (®, Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal Deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyldihydrazide, N,N'-bis(salicyloyl)-thiopropionyl dihydrazide.

4. Phosphites and Phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'- biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos 168 (®, Ciba Inc.), tris(nonylphenyl)phosphite,

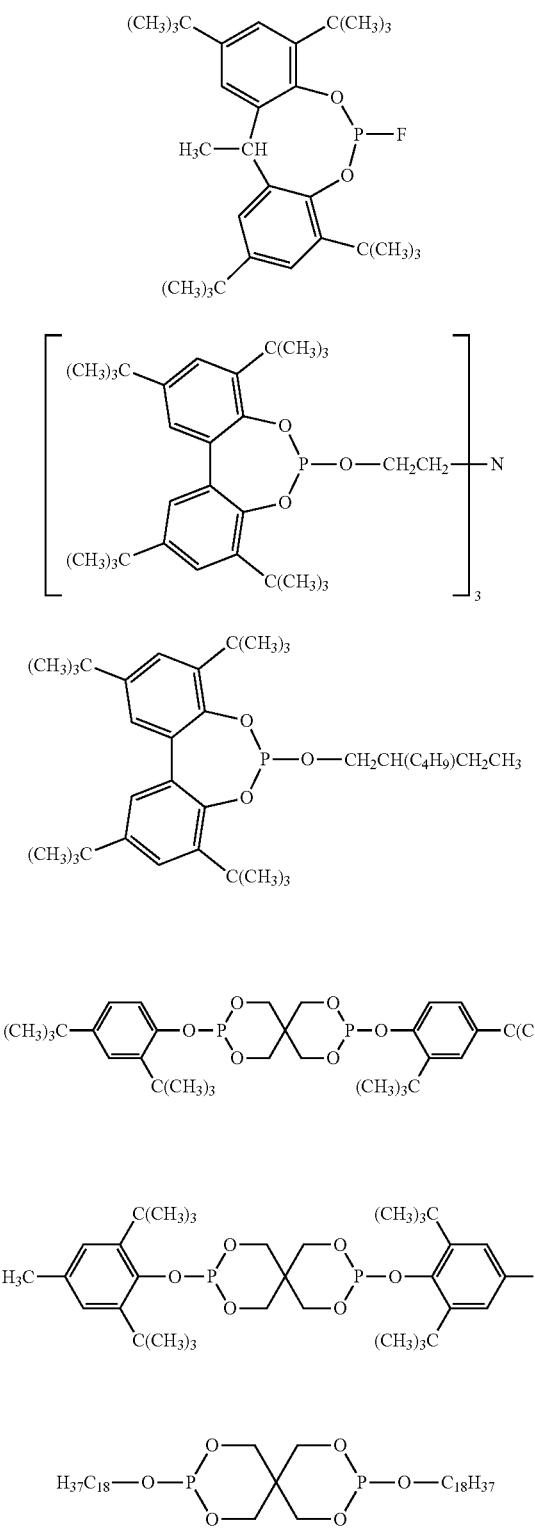

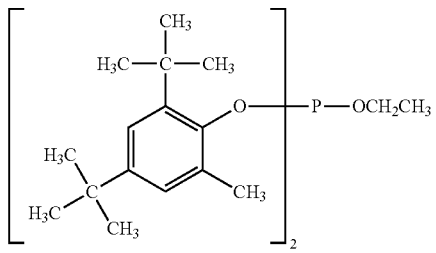

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-α-phenylnitrone, N-ethyl-α-methylnitrone, N-octyl-α-heptylnitrone, N-lauryl-α-undecylnitrone, N-tetradecyl-α-tridecylnnitrone, N-hexadecyl-α-pentadecylnitrone, N-octadecyl-α-heptadecylnitrone, N-hexadecyl-α-heptadecylnitrone, N-octadecyl-α-pentadecylnitrone, N-heptadecyl-α-heptadecylnitrone, N-octadecyl-α-hexadecylnitrone, nitrone derived from N,N-dialkylhydroxylamine derived from hydrogenated tallow amine.

7. Thiosynergists, selected from a group consisting of dimyristyl thiodipropionate, ditridecyl thiodipropionate and distearyl disulfide.

8. Peroxide Scavengers, selected from a group consisting of mercaptobenzimidazole or the zinc salt of 2-mercaptobenzimidazole and zinc dibutyldithiocarbamate.

9. Polyamide Stabilizers, for example copper salts in combination with iodides and/or phosphorus compounds and salts of divalent manganese.

10. Basic Co-Stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating Agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers), or Irgaclear XT 386 (®, BASF). Especially preferred are 1,3:2,4-bis(3',4'-dimethylbenzylidene)sorbitol, 1,3:2,4-di(paramethyldibenzylidene)-sorbitol and 1,3:2,4-di(benzylidene)sorbitol.

12. Fillers and Reinforcing Agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other Additives, for example pigments, such as carbon black, titanium dioxide in its rutile or anatase forms, color pigments; plasticisers; lubricants; emulsifiers; rheology additives; antislip/antiblock additives; catalysts; flow-control agents; optical brighteners; antistatic agents and blowing agents.

14. Benzofuranones and Indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butyl-benzofuran-2-one, 3-(2-acetyl-5-isooctylphenyl)-5-isooctylbenzofuran-2-one.

A further example of the present invention is a composition, which comprises additionally a phosphite or phosphonite as a further additive.

A further example of the present invention is a composition, which is free of tris(nonylphenyl)phosphite.

A further example of the present invention is a composition, which is free of phosphites or phosphonites as defined at item 4. of the aforementioned list.

Preferred is a composition, wherein the weight of a further additive is below 50% of the combined weight of component (a), component (b) and component (c).

The invention as defined herein comprises further embodiments, for which the above described preferences for a composition apply equally.

A further embodiment of the invention is a process for stabilization of an organic polymer against degradation by heat, light and/or oxidation, which is characterized by the incorporation of a composition into the organic polymer, wherein the composition comprises
(a) a compound of formula (A-I),
(b) a compound of formulae (B-I), (B-II), (B-III) or (B-IV), and
(c) a compound of formulae (C-I), (C-II) or (C-III).

A lot of possibilities for incorporation into an organic polymer are known. For example, incorporation at elevated temperatures, e.g. melt extrusion, is known for thermoplastic polymers. For other polymers, which are synthesized by polymerisation of their monomers in a solvent, the incorporation of additives occurs ideally at or after the end of the polymerisation.

Preferred is the incorporation of the composition, which comprises component (a), component (b) and component (c), at or after the end of the polymerisation step of the organic polymer.

Component (a), component (b) and component (c) are soluble in lipophilic solvents. Accordingly, the addition of the composition into an organic polymer, which is still suspended in a lipophilic solvent, provides a simple incorporation option by normal stirring. Typically, no emulsifier is required for the composition comprising component (a), component (b) and component (c), when it is incorporated in an organic polymer suspended in a lipophilic solvent.

In the case of a solvent-borne solution polymerisation of the organic polymer, the incorporation of the composition, which comprises component (a), component (b) and component (c), is preferred at or after the end of the polymerisation step of the organic polymer and prior to the coagulation step of the suspended organic polymer.

A further embodiment of the invention is the use of a composition, which comprises
(a) a compound of formula (A-I),
(b) a compound of formulae (B-I), (B-II), (B-III) or (B-IV), and
(c) a compound of formulae (C-I), (C-II) or (C-III),
for stabilisation of an organic polymer against degradation by heat, light and/or oxidation.

The following materials are employed in the examples.

'Polymer-1' is a styrene-butadiene-styrene block copolymer (=SBS), which originates from solution polymerisation and wherein the weight ratio of reacted monomers is 30 parts styrene and 70 parts butadiene.

'Phos-1' is commercially available as Irgafos TNPP (® BASF) and contains tris(nonylphenyl)phosphite:

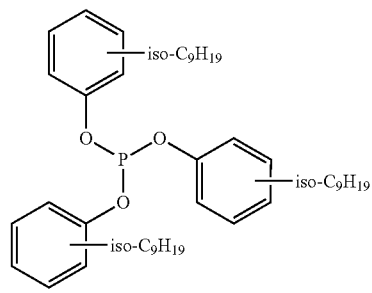

'Stab-a-1' is commercially available as Irganox 565 (® BASF) and contains 2,4-bis-(n-octylthio)-6-(3,5-di-tert-butyl-4-hydroxyphenylamino)-triazine:

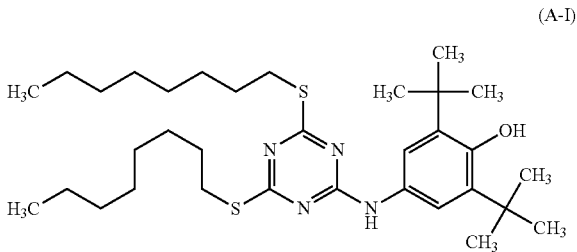 [SMILES: CCCCCCCCSc1nc(Nc2cc(C(C)(C)C)c(O)c(C(C)(C)C)c2)nc(SCCCCCCCC)n1]

(A-I)

'Stab-b-1' is commercially available as Seenox 412s (® Shipro Kasei Kaisha) and contains tetrakis-[(3-(n-dodecylthio)propionyloxy)methyl]methan (=2,2-bis[[3-dodecylthio)-1-oxypropyoxy]methyl]propan-1,3-diyl-bis[3-(dodecylthio)propionate]):

(B-I)

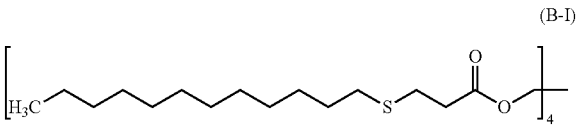

'Stab-c-1' is commercially available as Irganox 1076 (® BASF) and contains stearyl 3-(3,5-di-tert-butyl-4-hydroxyphenyl)propionic acid ester:

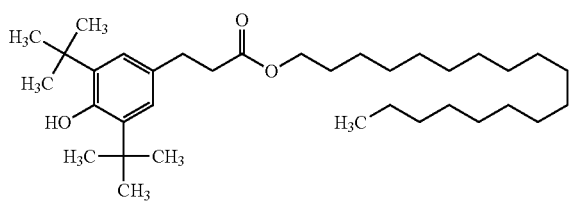 [SMILES: CCCCCCCCCCCCCCCCCCOC(=O)CCc1cc(C(C)(C)C)c(O)c(C(C)(C)C)c1]

Preparation of Test Plaques:

The additives are dissolved in cyclohexane as solvent to obtain a solution with a concentration of 10% by weight of the additives.

The respective amount of the additive solution is added to SBS cement (17% solid content of SBS polymer in cyclohexane, typical batch size is 294 g of cement [=solution/suspension of SBS in cyclohexane]).

The mixture with the cement is coagulated in deionized water at 80-90° C. to obtain SBS crumbs.

The SBS crumbs are dewatered on a two-roll mill at room temperature and these dried SBS crumbs are processed for 2 minutes at 110° C. on a two-roll mill to obtain a thin SBS rubber sheet. The SBS rubber sheet is compression-moulded at 115° C. for 8 minutes to obtain test plaques with a thickness of 2 mm.

TABLE 1

Composition of test plaques

| test plaques | Polymer-1 [parts] | Phos-1 [parts] | Stab-a-1 [parts] | Stab-b-1 [parts] | Stab-c-1 [parts] |
|---|---|---|---|---|---|
| com-1[a] | 100 | 0.4 | | | 0.2 |
| com-2[a] | 100 | | | 0.2 | 0.2 |
| com-3[a] | 100 | | 0.2 | | 0.2 |
| com-4[a] | 100 | | 0.2 | 0.2 | |
| inv-1[b] | 100 | | 0.03 | 0.15 | 0.2 |

[a]comparative
[b]inventive

Yellowness index is determined according to ASTM E313 with C light. A low value for the yellowness index is desired.

Lightness (L*) is determined according to CIELAB system. A high value for the lightness is desired.

An increase of the yellowness index indicates degradation. Heat stability is tested by oven ageing at 80° C.

TABLE 2

Color of test plaques before and after oven ageing at 80° C.

| test plaques | 0 min | | 3 days | | 5 days | | 7 days | |
|---|---|---|---|---|---|---|---|---|
| | YI[c] | L[d] | YI | L | YI | L | YI | L |
| com-1[a] | 21 | 78 | 43 | 76 | 72 | 71 | 106 | 66 |
| com-2[a] | 12 | 81 | 25 | 82 | 38 | 80 | 71 | 73 |
| com-3[a] | 12 | 80 | 20 | 82 | 22 | 81 | 23 | 80 |
| com-4[a] | 14 | 82 | 18 | 85 | 19 | 84 | 20 | 84 |
| inv-1[b] | 11 | 87 | 13 | 87 | 14 | 87 | 15 | 86 |

[a]comparative
[b]inventive
[c]yellowness index
[d]lightness

The results show that in a combination with 0.2 parts Stab-c1, the replacement of either 0.2 parts Stab-a1 or 0.2 parts Stab-b1 by 0.03 parts Stab-a1 and 0.15 parts Stab-b1 leads to a limited increase of the yellowness index, which indicates less degradation.

Light stability can be tested by the exposure to UV light. For example, 'QUV' testing can be performed in an apparatus supplied by Q-Lab corporation, wherein the test plaques are continuously irradiated with UV light (340 nm, 0.77 W/m$^2$) at a temperature of 60° C. for the indicated time period.

The invention claimed is:

1. A composition, which comprises (a) a compound of formula (A-I),

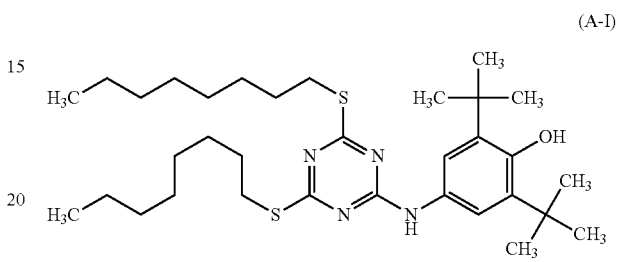

(b) a compound of formulae (B-I), (B-II), (B-III) or (B-IV)

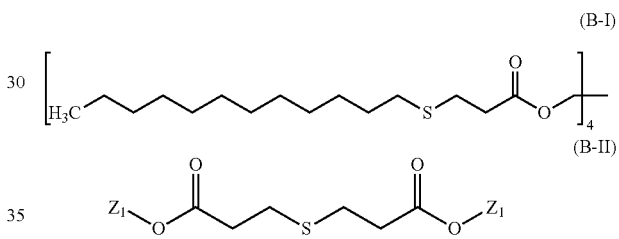

wherein $Z_1$ is linear $C_{12}$-alkyl or $C_{18}$-alkyl

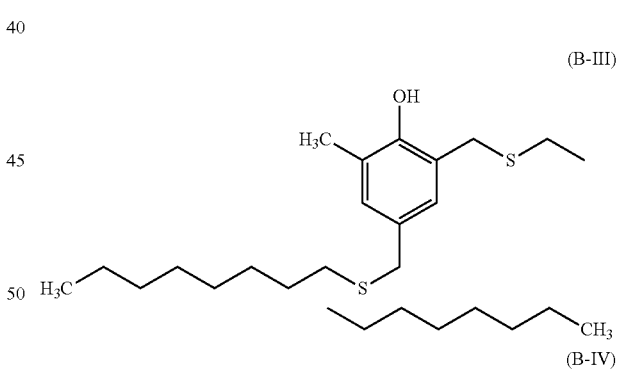

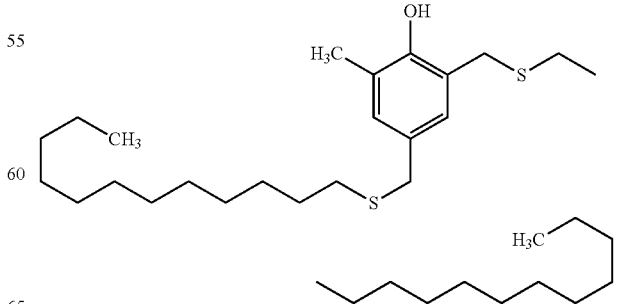

(c) a compound of formulae (C-I), (C-II) or (C-III)

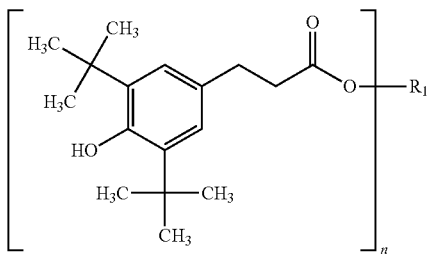

(C-I)

wherein
n=1 or 4,
when n=1, R₁ is $C_1$-$C_{18}$ alkyl and
when n=4, R₁ is 2,2-dimethylprop-1,3,1',1''-tetrayl

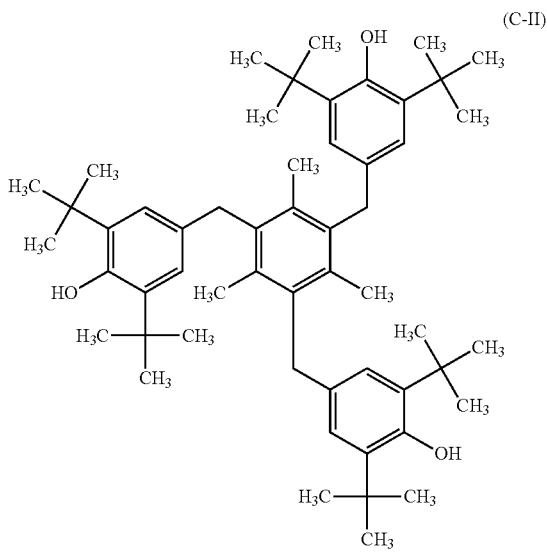

(C-II)

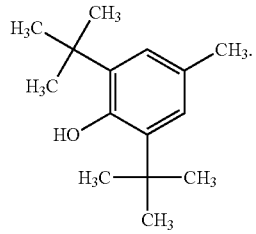

(C-III)

and (d) an organic polymer,
wherein the organic polymer (d) is selected from the group consisting of butadiene-styrene copolymers, isoprene-styrene copolymers and butadiene polymers.

2. The composition according to claim 1, wherein the organic polymer (d) originates from a solution polymerisation process or an emulsion polymerisation process.

3. The composition according to claim 1, wherein the organic polymer (d) is selected from the group consisting of styrene-butadiene-styrene block copolymer, styrene-isoprene-styrene block copolymer, styrene-ethylene-butadiene-styrene copolymer, styrene-butadiene-styrene random copolymer and polybutadiene.

4. The composition according to claim 1, wherein the weight ratio of component (a) to component (b) is from 2 to 1 to 1 to 20.

5. The composition according to claim 1, wherein the weight ratio of component (a) to component (d) is from 1 to 1 to 1 to 60.

6. The composition according to claim 1, wherein the weight ratio of component (a) to (b) is from 2 to 1 to 1 to 20 and the weight ratio of component (a) to component (c) is from 1 to 1 to 1 to 60.

7. The composition according to claim 1, wherein the combined weight of component (a), component (b) and component (c) is from 0.02% to 10% of the weight of component (d).

8. The composition according to claim 1, wherein the weight of component (a) is from 0.015% to 0.1% of the weight of component (d), the weight of component (b) is from 0.045% to 0.3% of the weight of component (d) and the weight of component (c) is from 0.1% to 0.8% of the weight of component (d).

9. The composition according to claim 1 comprising further additives.

10. A process for stabilization of an organic polymer against degradation by heat, light and/or oxidation, the process comprising incorporating a composition as defined in claim 1 into the organic polymer.

* * * * *